United States Patent [19]

Mayerhofer

[11] 4,067,655

[45] Jan. 10, 1978

[54] DEVICE FOR CONNECTING PLATE MEMBERS OR SIMILAR CONSTRUCTIONAL PARTS

[76] Inventor: Edvin Sven Mayerhofer, Andergasse 84, Vienna, Austria, 1170

[21] Appl. No.: 683,350

[22] Filed: May 5, 1976

[30] Foreign Application Priority Data

June 5, 1975 Austria .................................. 3449/75

[51] Int. Cl.² .............................................. F16D 1/00
[52] U.S. Cl. ......................................... 403/4; 403/231; 16/167; 52/285
[58] Field of Search ............... 403/231, 382, 403, 205, 403/402, 4; 52/753 D, 753 Y, 753 C, 753 J, 285; 16/167

[56] References Cited

U.S. PATENT DOCUMENTS

| 566,323 | 8/1896 | Kelleher et al. | 16/130 |
| 779,770 | 1/1905 | Curry | 52/753 D |
| 3,204,905 | 9/1965 | Morban | 52/753 D X |
| 3,857,150 | 12/1974 | Faucheux | 52/81 X |
| 3,926,529 | 12/1975 | Brooks | 52/753 D |

Primary Examiner—Andrew V. Kundrat
Attorney, Agent, or Firm—Townsend and Townsend

[57] ABSTRACT

Device for connecting plate members or similar constructional parts by means of connecting elements. Each connecting element consists of two pivotably connected component parts. At the area of connection, each plate member is enclosed by two such component parts of different connecting elements. The component parts of the connecting elements are provided with holes into which fastening means. e.g., fastening screws, are inserted. Before the screws are tightened the relative angular position of the plates is adjusted as desired. Thereafter screws are tightened to firmly connect the plates with the component parts and immovably hold the plates in their desired angular positions. The plate members are thus rigidly connected with one another at any desired angle.

15 Claims, 7 Drawing Figures

DEVICE FOR CONNECTING PLATE MEMBERS OR SIMILAR CONSTRUCTIONAL PARTS

The invention refers to a device for connecting plate members or similar constructional parts. The term "plates or similar constructional parts" particle boards, synthetic resin plates, glass plates, boards or the like. Plate members of equal material or plate members of different materials can be mutually connected. The plate members may have the same thickness or may be of different thickness.

Particularly with the erection of exhibition stands and shop installations, it is frequently necessary to rapidly and simply mount and dismount partition walls, shelves, lockers or other furniture made of plate-like materials. When transporting dismantled furniture it is often equally necessary to immovably connect the plate-like individual parts by means of suitable devices. In each case the connection should be effected in a simple manner without the aid of complicated tools.

There are already known devices for connecting plate members or similar materials. These known devices however, show some drawbacks. In some instances, their manipulation is complicated, in other instances it is not possible to establish with such devices a stable connection. Above all, prior art devices allow only to mutually connect plate members in such a manner that they include with one another a predetermined, e.g. a right angle. Thus, such devices do not allow one to connect the plate members at any desired angle. Furthermore, such prior art devices are incapable of connecting three or more plate members so that they adjoin each other with their edges, e.g. they do not prevent the formation of a T-shaped, a Y-shaped, a star-shaped or a cross-shaped connection of the plates.

It is an object of the invention to provide a device for connecting plate members or similar constructional parts which is of simple construction and which can easily be fixed in place.

It is a further object of the invention to provide a device for connecting plate members or similar structural parts which which allows the plate members to be connected with one another at a relatively wide range of angles.

It is a still further object of the present invention to provide a device for connecting plate members or similar constructional parts which allows to mutually connect at one connecting area a plurality of plate members in the form of a T-shaped or a cross-shaped connection, for example.

According to the invention, the device for connecting plate members or similar constructional parts consists of connecting elements, each of which comprises two component parts that are mutually pivotally connected. At each connection are a the plates are disposed between two component parts of different connecting elements. Fastening means are provided for firmly securing the component parts of the connecting elements to the plate members. When establishing a connection by means of a device according to the invention, the component parts of the connecting elements are first loosely fixed to the plate members, whereupon the desired angle between the plate members is adjusted and subsequently the component parts of the connecting elements are firmly secured to the plate members by means of the fastening means, so that the plate members are rigidly connected in the desired relative position.

Further advantages and features of the invention result from the following description of an embodiment of a device according to the invention as shown in the drawing.

DESCRIPTION OF THE PREFERRED EMBODIMENTS

Figure 1:
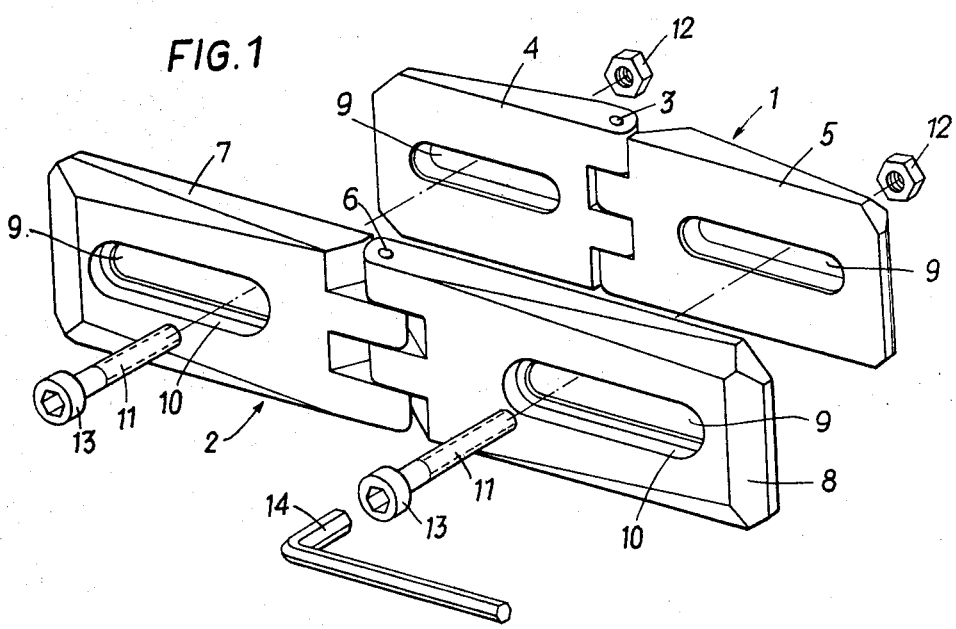
FIG. 1 shows an exploded perspective view of two connecting elements together with their fastening means, FIGS. 2 to 4 sequentially show in a top-plan view the the manner in which two plates are connected at right angles with a device constructed according to the invention.

The device shown in FIGS. 1 to 4 comprises two connecting elements 1, 2, the connecting element 1 having two component parts 4, 5 that are mutually pivotally connected at 3, whereas the connecting element 2 has two component parts 7, 8 that are mutually pivotally connected at 6. Each of said component parts has an elongated slot 9 which is provided with a countersunk enlargement 10. Connecting screws 11 extend through aligned elongated slots 9 of both connecting elements 1, 2, the screw-head 13 of each screw having an inner hexagonal tap-hole and nuts 12 being threaded onto the threaded portion of said screws. When the nuts are tightened on the screws the screw heads 13 as well as the nuts 12 into slots 9 of the connecting elements 1, 2. For tightening the connecting screws a hexagonal key 14 is provided which can be inserted into the inner hexagonal tap-hole of the screw head 13.

In place of connecting screws 11 other fastening elements, for instance rivets, can be used.

Instead of using connecting screws extending through opposing component parts of the connecting elements 1, 2 screws which extend only through one component part of a connecting element 1, 2, such as wood screws, which are anchored in one plate member, can be employed. In such a case, circular holes can be provided in the component parts of the connecting elements instead of the elongated slots 9.

Figure 2:
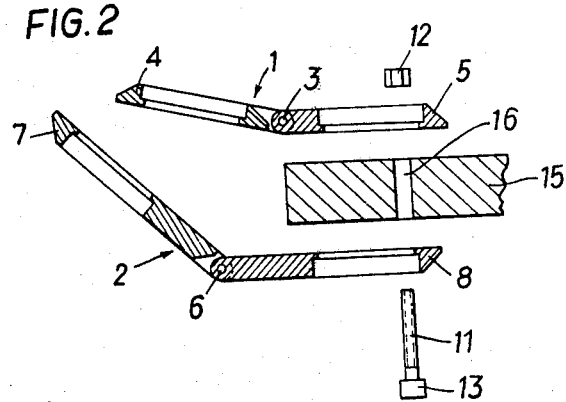
Figure 3:
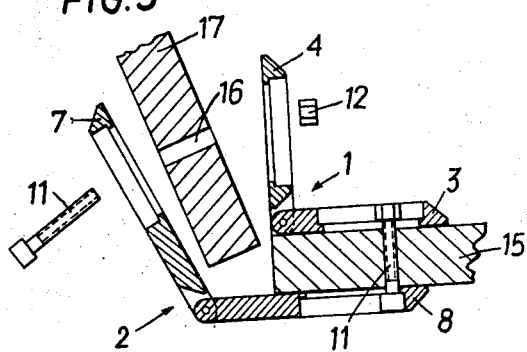
Figure 4:
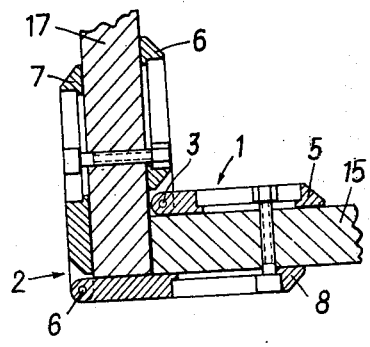

When connecting two plate members by means of a device as shown in the FIGS. 1 to 4, a hole 16 is made in one plate 15 in the manner illustrated in FIG. 2, the center of said hole being spaced a certain distance of for example 40 mm from the edge of the plate member. The diameter of said hole 16 is slightly greater than the diameter of the connecting screw 11. Subsequently, the connecting screw 11 is extended through the elongated slot of the connecting element 1, through the hole 16 and through the elongated slot 9 of the other connecting element 2 it is then loosely tightened with nut 12. Subsequently a hole 16 is made in the other plate member 17 in the manner illustrated by FIG. 3, the center of said hole 16 being spaced again a certain distance of for example 40 mm from the edge of the plate member 17. Now, the second connecting screw 11 is extended through the other elongated slots 9 of both connecting elements 1, 2 and through the hole 16 in plate member 17 and secured thereto with nut 12. Subsequently, as is illustrated in FIG. 4, both plate members 15, 17 are moved such that they abut each other and include the desired angle, for instance the right angle shown in FIG. 4. Movement of the plate members is made possible in view of the elongated slots 9 within which the screw heads 13 as well as the nuts 12 can slide. When tightening the connecting screws by means of a hexagonal key 14 the theretofore pivotal connection of both component parts of the connecting elements 1, 2 becomes fixed and both plate members 15, 17 become rigidly connected to each other and to the connecting elements.

Figure 5:
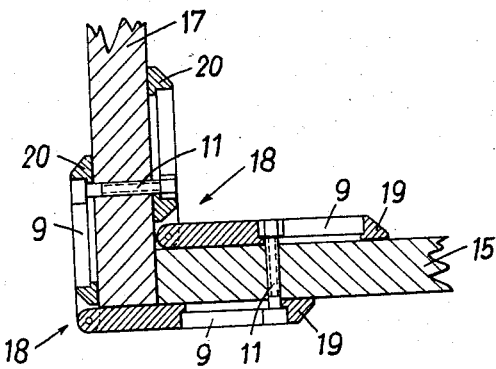
FIG. 5 shows the connection of two plate members at a right angle by means of differently constructed connecting elements.

In the embodiment shown in FIGS. 1 to 4, the connecting elements 1, 2 differ from each other to allow the holes 16 in both plate members 15, 17 to always be located at equal distances from the respective edges of the plate members and to allow, in spite thereof, the formation of the desired connection. In this embodiment, the component parts 4, 5 of the connecting element 1 are shorter in length than the component parts 7, 8 of the connecting element 2. To form a connection with a connecting element of unitary size, a connecting element 18 as shown in FIG. 5 can be used. The connecting element 18 comprises a longer component part 19 and a shorter component part 20, both component parts again being mutually pivotally connected. The component parts 19, 20 again are provided with elongated slots 9 through which connecting screws 11 extend. When establishing a connection as shown in FIG. 5 the same steps are performed as when establishing a connection as shown in FIG. 4.

Figure 6:
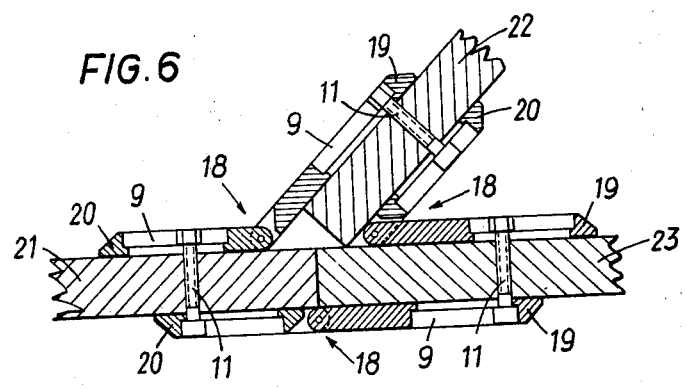
FIGS. 6 and 7 show in a top-plan view the Y- or cross-shaped connection of plate members in accordance with the invention.
Figure 7:
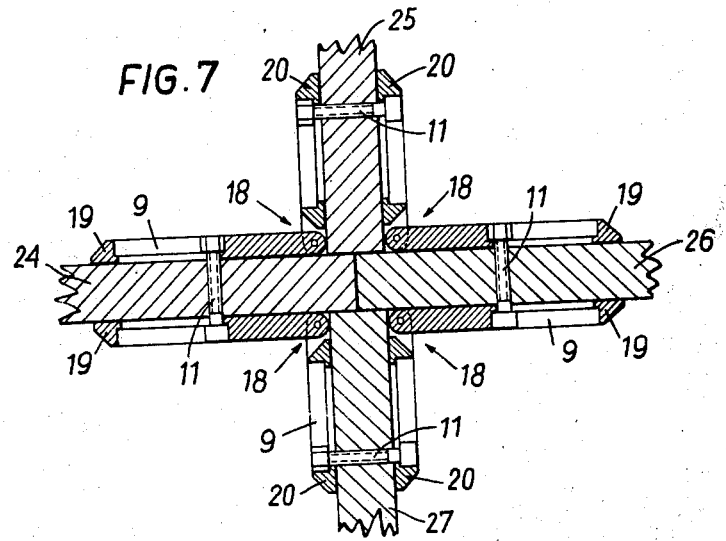

FIG. 6 shows how three plate members 21, 22, 23 are connected by means of three connecting elements 18 to form a star-shaped or a Y-shaped structure, in which the plate members 21, 22, 23 are again rigidly and securely connected with one another. FIG. 7 illustrates the erection of a cross-shaped structure of four plate members 24, 25, 26, 27 by means of four connecting elements 18. Here again, the plate members are rigidly and immovably connected with one another after tightening the connecting screws 11.

In the drawing, connection of plate members of equal thickness is illustrated. It is, of course, possible to connect plates of different thicknesses with a device constructed according to the invention. In case it is desired to loosen the plate connection or to change the angle included by the plates, one only needs to loosen or, respectively, to remove the screw nuts 12. It should be noted that aside from the formation of hole 16 the plate members are undamaged and ready for further use.

What I claim is:

1. Apparatus for rigidly securing a plurality of plate members at variable relative angular positions with respect to each other, the apparatus comprising first and second connectors disposed on opposite sides of the plate members, each connector being defined by first and second hinge plates for placement against the first and second plate members, respectively, pivot means pivotally connecting the first and second hinge plates of each connector to each other; and fastening means for biasing the first and second hinge plates of the connectors firmly against the plate members while the plate members are positioned in their desired angular orientation; whereby the relative angular orientation of the plate members can be adjusted as desired before the biasing means is applied, and whereby the application of the biasing means causes the formation of a rigid interconnection between the plate members at the chosen relative angular orientation.

2. Apparatus according to claim 1 wherein the hinge plates are positioned on the plate members so that the connectors overlap each other.

3. Apparatus according to claim 2 wherein the fastening means comprises an aperture defined by each hinge plate, and tightening means extending through the aperture and biasing the respective hinge plate into firm contact with the plate member.

4. Apparatus according to claim 3 wherein the aperture comprises a round hole.

5. Apparatus according to claim 3 wherein the aperture comprises an elongate slot oriented transversely to the pivot axis of the pivot means, and wherein the tightening means comprises a tension member extending through the plate member between opposing first hinge plates and opposing second hinge plates, the tension member biasing the hinge plates firmly against the plate member.

6. Apparatus according to claim 5 wherein the connectors are of identical constructions.

7. Apparatus according to claim 2 wherein the hinge plates of one of the connectors have a length in a direction transverse to the pivot axis of the pivot means which differs from the corresponding length of the hinge plates of the other connector.

8. Apparatus for rigidly interconnecting a plurality of plate members at adjustable relative angles, the apparatus comprising: a plurality of plate connectors, each connector having first and second hinge plates including parallel elongate slots; means interconnecting the hinge plates of each connector for pivotal movement about an axis that is perpendicular to the slots; and fastening means extending through a plate member placed between opposing hinge plates for interconnecting opposing first hinge plates and opposing second hing plates of the connectors, and through aligned slots of the hinge plates, the fastening means including means for applying a force against the hinge plates which biases the hinge plates into firm and immovable contact with the plate member disposed between the hinge plates; whereby the relative angular position of the plate members can be freely adjusted until the fastening means is tightened and the plate members thereafter become rigid and immovable with respect to each other.

9. Apparatus according to claim 8 wherein the plurality of plates comprises more than two plates, and wherein the plurality of connectors equals the plurality of plate members.

10. A connection of at least two plate members at rigid but relative freely selectable angular positions comprising in combination a plurality of plate members positioned at the desired relative angular orientation; a first connector defined by first and second hinge plates and means freely pivotally interconnecting the hinge plates, each hinge plate including an aperture, the hinge plates of the first connector being placed against respective sides of the plate members; a second connector defined by a pair of hinge plates and means freely interconnecting the hinge plates, each hinge plate of the second connector including an aperture, the hinge plates of the second connector being placed against other sides of the plate members; and means extending through the hinge plate apertures for firmly pressing the respective hinge plates against the respective sides of the plate members to thereby immovably secure the hinge plates to the plate members; whereby the immovable attachment of the hinge plates to the plate members at the preselected relative angular orientations of the plate members rigidly and immovably secures the plate members at such angular orientation to each other.

11. Apparatus according to claim 10 wherein the securing means comrpises threaded screw means extending through the hinge plates apertures.

12. Apparatus according to claim 10 wherein the first and second connectors are in mutual alignment, and wherein the fastening means comrpises bolt means simultaneously extending through the apertures of opposing and mutually aligned hinge plates of the first and second connectors and through the plate member disposed therebetween.

13. Apparatus according to claim 12 wherein the apertures comprise elongated slots oriented substantially perpendicular to the pivot axes of the hinge means.

14. Apparatus according to claim 10 including a plurality of at least three plate members secured to each other at a common connection area and having preselectable relative angular orientations, and including a plurality of connectors which is at least as large as the plurality of plate members secured to each other.

15. Apparatus according to claim 10 wherein the hinge plates extend over edges of the plate members, and wherein the plate member edges are in mutual abutment when the securing means is tightened.

* * * * *